Patented Aug. 11, 1925.

1,549,656

UNITED STATES PATENT OFFICE.

EDWIN D. DRUMMOND, OF BIRMINGHAM, ALABAMA.

PAVING PROCESS.

No Drawing. Application filed February 2, 1923. Serial No. 616,626.

*To all whom it may concern:*

Be it known that I, EDWIN D. DRUMMOND, a citizen of the United States, residing at Birmingham, in the county of Jefferson and State of Alabama, have invented new and useful Improvements in Paving Processes, of which the following is a specification.

This invention relates to a process of treating road material so that roads can be built at comparatively low cost and from certain materials invariably found adjacent to the road to be built.

This process can be used with either of three materials, namely, sand-gravel, chert or sand-clay.

The formula applies in each case exactly, by substituting either of the above named materials.

(A) Take sand-gravel as it comes from the pit or bed to an asphalt plant where it is heated to between 225° and 350° F., then run it into a mixer and thoroughly mix it after asphalt cement heated to 225° to 350° F., is added and mixed until all materials are thoroughly coated. Then limestone dust is added while the material is in the mixer. After being thoroughly mixed it is taken to the road and placed on a prepared sub-grade at from 3" to 6" thick and thoroughly rolled with a ten-ton roller. The material can be placed in two layers if necessary.

(B) In the formula containing chert, chert must be run through a crusher having capacity up to 2" and with a portable plant can be heated and mixed right at the pit and delivered on the road ready to be laid and rolled in two courses.

(C) This formula is the same as "A" substituting sand-clay for sand-gravel.

My invention or discovery consists in taking these natural materials and heat-treating them and then adding hot asphalt cement and limestone dust. By doing this, I make these materials which are now used in their natural state, more durable and wear-resisting. The limestone dust is not heated and it acts to toughen the mixture so that it will have greater wearing parts.

This process permits a road to be built cheaply if natural materials herein mentioned can be found in the vicinity in which the road is to be built. This material is treated as it comes from the pit for dumping on prepared sub-grade.

This mixture can also be used as a base course for existing bituminous pavings.

What I claim is:—

The herein described process consisting in heating fine and coarse aggregate from which the road is to be formed while in its natural state to dry the material and then mixing with the material hot asphalt cement to bind it and finally adding limestone dust to toughen the mixture.

In testimony whereof I affix my signature.

EDWIN D. DRUMMOND.